US012785464B2

(12) United States Patent
Lu et al.

(10) Patent No.: US 12,785,464 B2
(45) Date of Patent: Nov. 3, 2026

(54) MOTOR AND VEHICLE

(71) Applicant: Xiaomi EV Technology Co., Ltd., Beijing (CN)

(72) Inventors: Runda Lu, Beijing (CN); Changte Zhang, Beijing (CN); Yongjin Kong, Beijing (CN); Yemeng Gao, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 142 days.

(21) Appl. No.: 18/807,180

(22) Filed: Aug. 16, 2024

(65) Prior Publication Data

US 2025/0141282 A1 May 1, 2025

(30) Foreign Application Priority Data

Oct. 30, 2023 (CN) ........................ 202311413910.8

(51) Int. Cl.

*H02K 1/16* (2006.01)
*H02K 1/04* (2006.01)
*H02K 3/28* (2006.01)

(52) U.S. Cl.

CPC ................ *H02K 1/16* (2013.01); *H02K 1/04* (2013.01); *H02K 3/28* (2013.01); *H02K 2213/03* (2013.01)

(58) Field of Classification Search

CPC .. H02K 1/16; H02K 1/04; H02K 3/28; H02K 2213/03; H02K 3/12; H02K 3/50; Y02T 10/64

See application file for complete search history.

(56) References Cited

U.S. PATENT DOCUMENTS 8,716,910 B2 * 5/2014 Edrington ................ H02K 3/50 310/179
11,296,570 B2 * 4/2022 Neet ........................ H02K 3/12
2021/0273537 A1 * 9/2021 Toi ........................... H02K 3/12

FOREIGN PATENT DOCUMENTS

CN 103119833 A 5/2013
EP 3429063 A1 1/2019
JP 7342307 B1 9/2023

OTHER PUBLICATIONS

First Office Action issued by the State Intellectual Property Office of People's Republic of China on Dec. 7, 2023, in corresponding Application No. CN 202311413910.8, 5 pages.

(Continued)

*Primary Examiner* — Tulsidas C Patel
*Assistant Examiner* — Mohammed Ahmed Qureshi
(74) *Attorney, Agent, or Firm* — Finnegan, Henderson, Farabow, Garrett & Dunner, L.L.P.

(57) ABSTRACT

A motor includes a stator. The stator includes a stator core and an end winding. The stator core has a central hole configured for assembly of a rotor. The end winding is arranged at an end of the stator core, and includes an inner flat wire conductor adjacent to the central hole. The inner flat wire conductor includes first and second coupling segments embedded in the stator core, and a bridging segment coupled between the first and second coupling segments. An extension dimension of the first coupling segment of the inner flat wire conductor and an extension dimension of the second coupling segment of an adjacent inner flat wire conductor have an axial length difference in the axial direction, so that an overlapped part of two adjacent inner flat wire conductors form staggered approach avoidance in the axial direction and reduce radial intrusion into the central hole.

19 Claims, 8 Drawing Sheets

(56) References Cited

OTHER PUBLICATIONS

Extended European Search Report Issued in Application No. 24181684.2 dated Feb. 5, 2025, 8 pages.

* cited by examiner

MOTOR AND VEHICLE

CROSS-REFERENCE TO RELATED APPLICATIONS

The present application claims the benefit of priority to Chinese Application No. 202311413910.8, filed on Oct. 30, 2023, the contents of which are incorporated herein by reference in their entireties for all purposes.

FIELD

The present disclosure relates to the field of motors, and in particular to a flat wire motor and a vehicle using the flat wire motor.

BACKGROUND

Drive motors are a part of the core three-electric system of new energy vehicles, and the performance of the drive motors directly determines the driving performance of new energy vehicles. A slot full rate of the motors influences the operational efficiency of the motor.

SUMMARY

According to a first aspect of the present disclosure, a motor includes: a stator. The stator includes a stator core and an end winding. The stator core has a central hole configured for assembly of a rotor. The end winding is arranged at an end of the stator core, and the end winding includes an inner flat wire conductor adjacent to the central hole. The inner flat wire conductor includes a bridging segment, and a first coupling segment and a second coupling segment embedded in the stator core, and the bridging segment is coupled between the first coupling segment and the second coupling segment. An extension dimension of the first coupling segment of the inner flat wire conductor and an extension dimension of the second coupling segment of an adjacent inner flat wire conductor have an axial length difference in an axial direction of the stator core, so that an overlapped part of two adjacent inner flat wire conductors form staggered approach avoidance in the axial direction and reduce radial intrusion into the central hole.

According to a second aspect of the present disclosure, a vehicle includes a motor and the motor includes a stator. The stator includes a stator core and an end winding. The stator core has a central hole configured for assembly of a rotor. The end winding is arranged at an end of the stator core, and the end winding includes an inner flat wire conductor adjacent to the central hole. The inner flat wire conductor includes a bridging segment, and a first coupling segment and a second coupling segment embedded in the stator core, and the bridging segment is coupled between the first coupling segment and the second coupling segment. An extension dimension of the first coupling segment of the inner flat wire conductor and an extension dimension of the second coupling segment of an adjacent inner flat wire conductor have an axial length difference in an axial direction of the stator core, so that an overlapped part of two adjacent inner flat wire conductors form staggered approach avoidance in the axial direction and reduce radial intrusion into the central hole.

DETAILED DESCRIPTION

Figure 1:
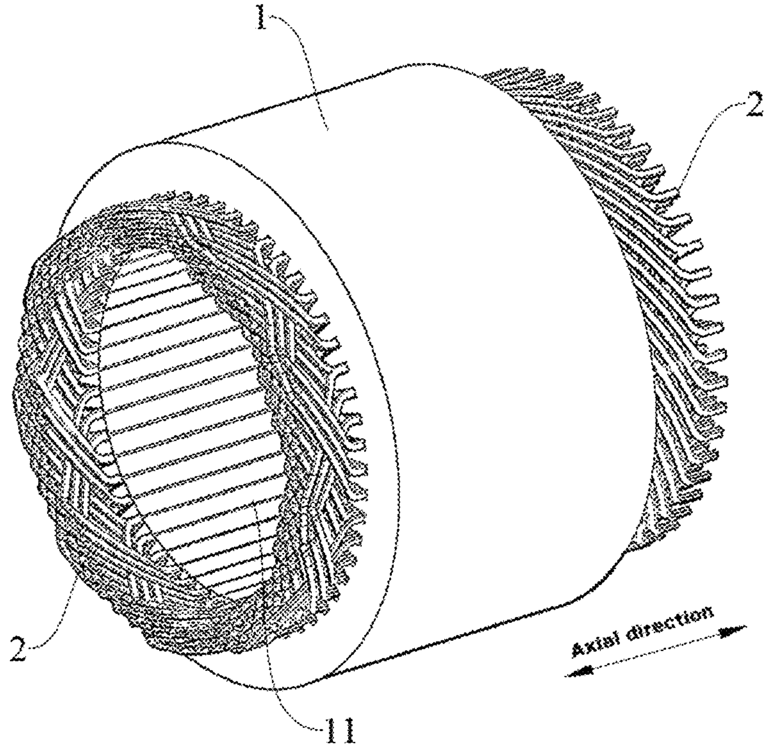
FIG. 1 is a schematic perspective view of a stator according to an embodiment of the present disclosure.

Embodiments of the present disclosure will be described in detail below, examples of which are illustrated in the accompanying drawings. Embodiments described below by referring to the drawings are exemplary and are intended to explain the present disclosure, but not to be construed as limiting the present disclosure.

At present, in order to achieve a higher slot full rate, a winding of the motors is also evolving from round wires to flat wires. However, in the related art, PIN wires (flat wires) of the winding bridged in the same layer occupy an inner diameter space of a stator core, which may lead to the problem of making a motor rotor interfere and collide with the PIN wires when it is assembled to the inner space of the motor stator, reducing the assemblability.

Figure 2:
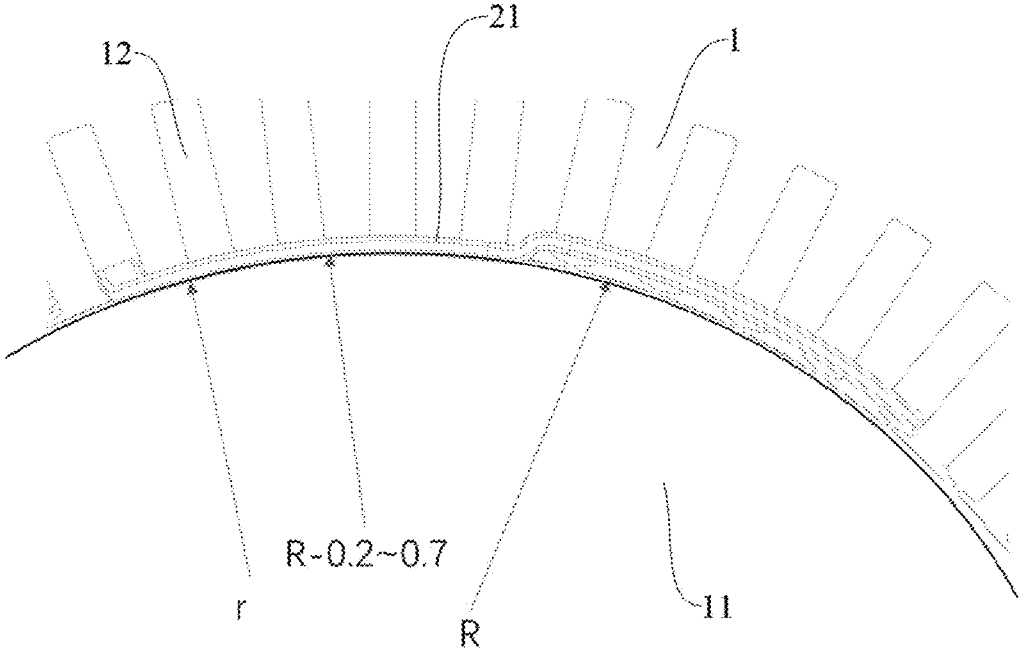
FIG. 2 is a schematic diagram of an inner flat wire conductor intruding into a central hole of a stator core in the related art.

As illustrated in FIG. 2, in the related art, a radius of an inner circle (i.e., a space containing a rotor) of a stator core 1 is R, and an inner radius of a PIN wire 21 bridged in an innermost layer of an end winding 2 is 0.2~0.7 mm smaller than the radius R of the inner circle of the stator core 1, which means that this PIN has intruded into a space within the inner circle of the stator core (i.e., an air gap between the stator and the rotor).

In FIG. 2, r refers to a radius of an outer circle of the rotor, which is usually slightly smaller than the radius of the inner circle of the stator. Considering the influence of the assembly concentricity of the stator and the rotor, some local gaps will be smaller during actual installation. Therefore, the PIN wire 21 in FIG. 2 will intrude into the space within the inner circle of the stator core 1, and an intrusive part of the PIN wire 21 will directly affect the assemblability of the rotor from this side. That is, if the rotor is installed from this side, it may easily cause the rotor and the winding to scratch, which leads to a high defect rate in motor machining and increases a production cost.

Figure 3:
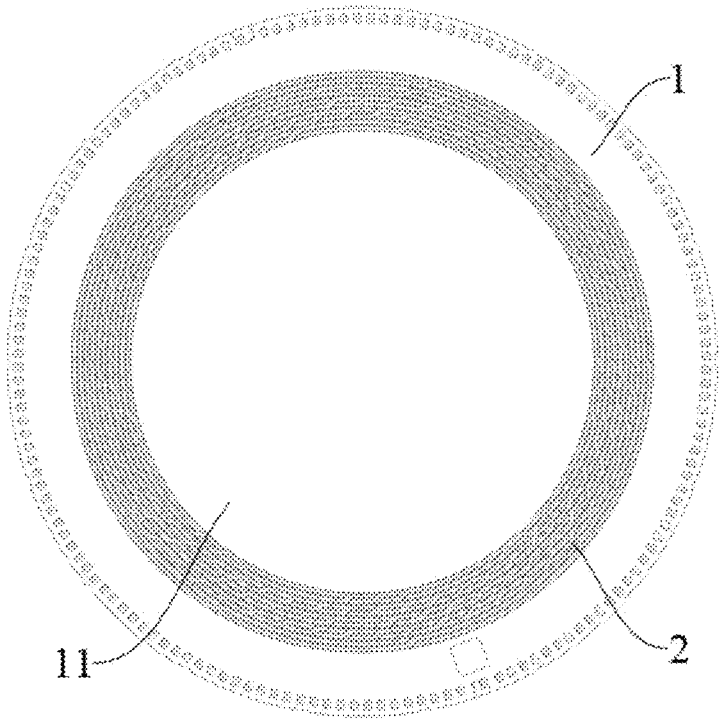
FIG. 3 is a schematic view of an end of a stator according to an embodiment of the present disclosure.

The motor according to embodiments of the present disclosure includes a stator. FIG. 1 is a schematic perspective view of a stator according to an embodiment of the present disclosure. FIG. 3 is a schematic view of an end of a stator according to an embodiment of the present disclosure. As illustrated in FIGS. 1 and 3, the stator includes a stator core 1 and an end winding 2. The stator core 1 may be substantially annular, an inner space of the stator core 1 is a central hole 11, and a rotor of the motor is assembled into the central hole 11 of the stator core 1. When in use, the rotor may rotate in the central hole 11.

Figure 8:
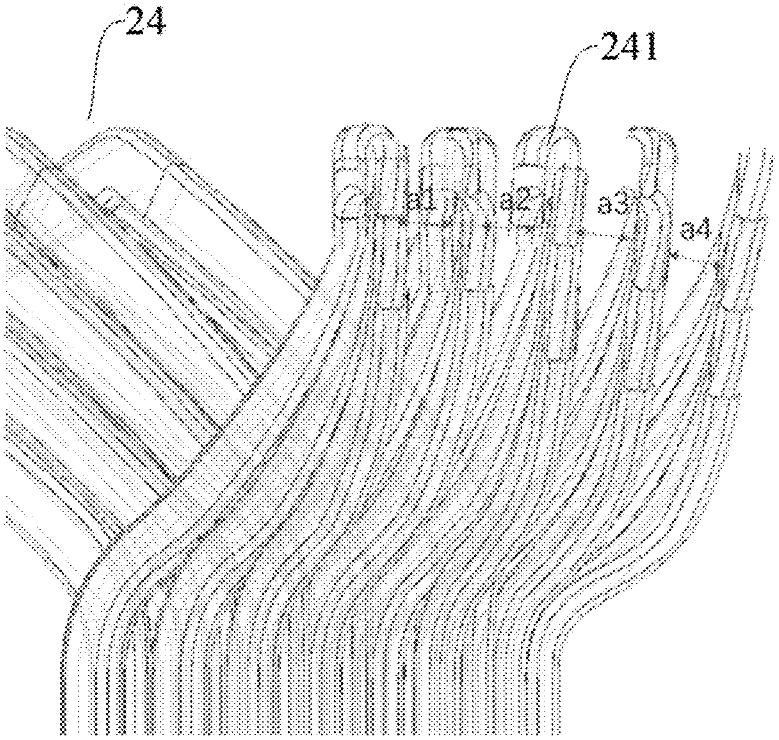
FIG. 8 is a schematic diagram of an arrangement of a plurality of flat wire conductors of a conductor group according to an embodiment of the present disclosure.

The stator may have two end windings 2, and the two end windings 2 are respectively arranged at two ends of the stator core 1 in an axial direction. FIG. 8 is a schematic diagram of an arrangement of a plurality of flat wire conductors of a conductor group according to an embodiment of the present disclosure. As illustrated in FIG. 8, each end winding 2 may have a plurality of conductor groups 24, and the plurality of conductor groups 24 may be arranged at equal intervals along a circumferential direction of the stator core 1. Each conductor group 24 may include a plurality of flat wire conductors 241 sequentially arranged along a radial direction of the stator core 1, and a flat wire conductor 241 located in an innermost side of each conductor group 24 (a flat wire conductor 241 adjacent to the central hole 11 or an axis of the stator core 1) is an inner flat wire conductor 22.

Figure 4:
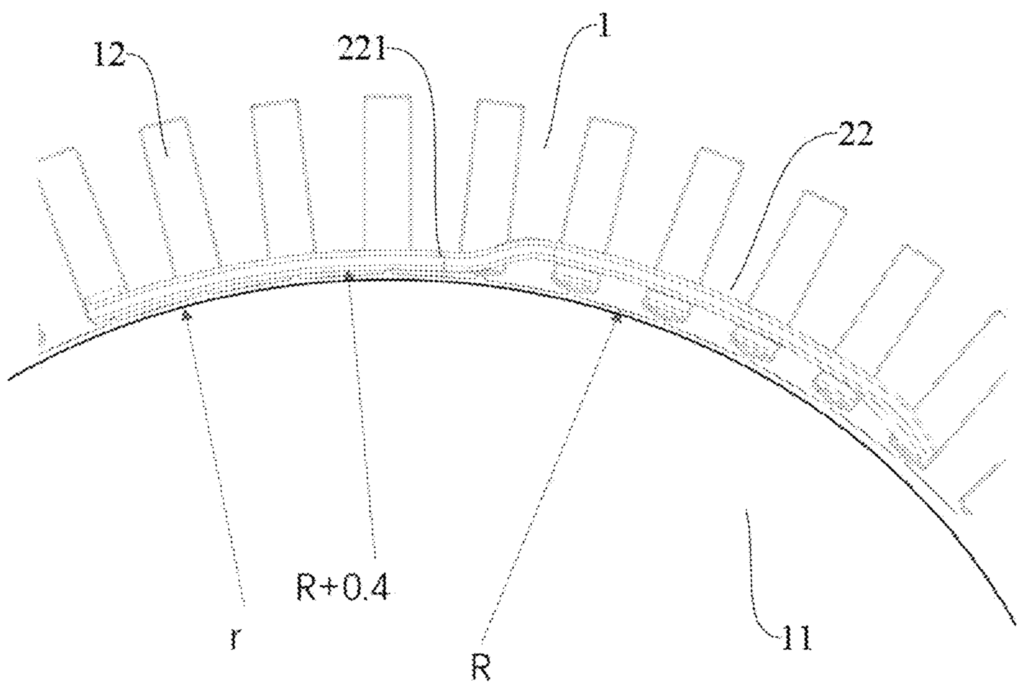
FIG. 4 is a partially enlarged schematic view of an inner flat wire conductor in FIG. 3.
Figure 5:
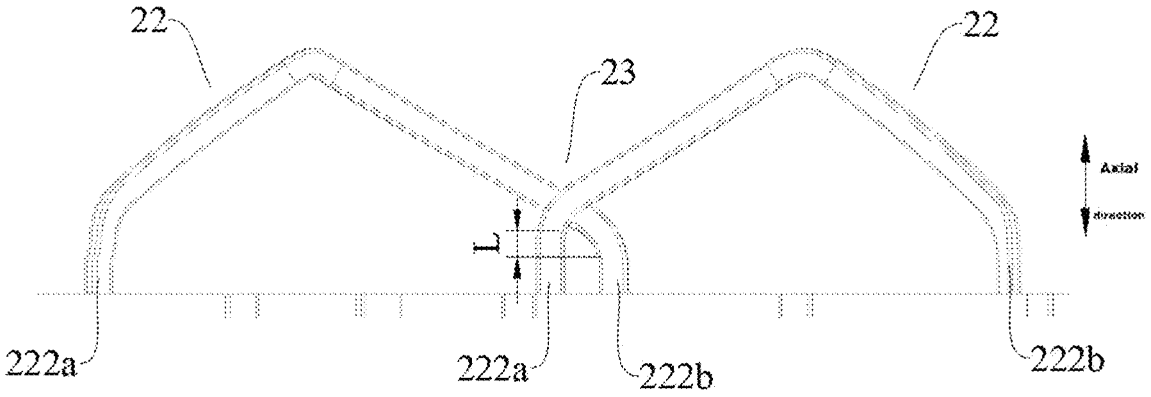
FIG. 5 shows two inner flat wire conductors according to an embodiment of the present disclosure.
Figure 6:
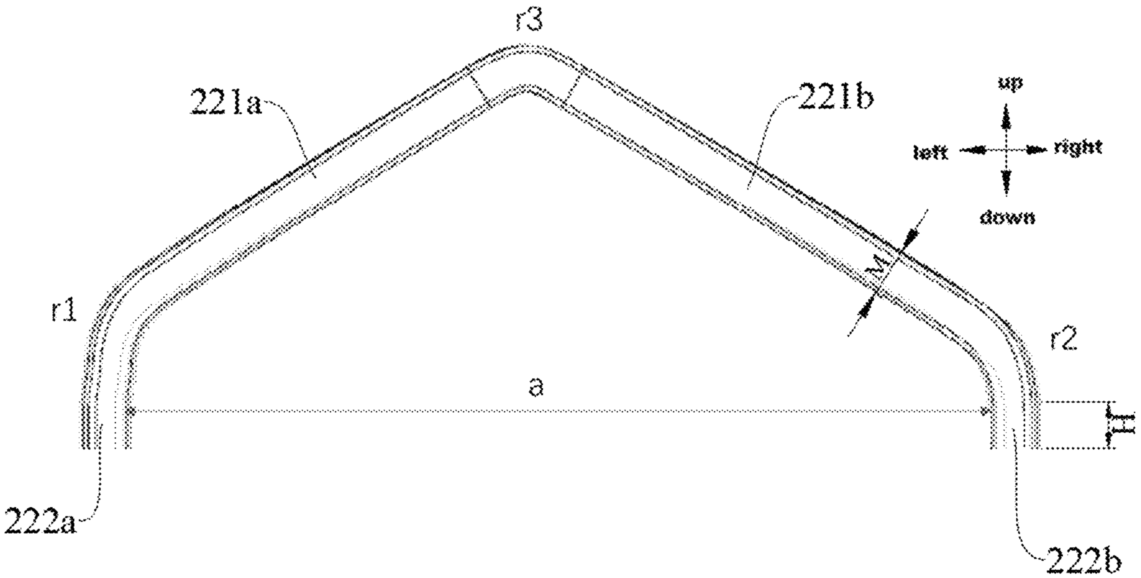
FIG. 6 is a schematic diagram of an inner flat wire conductor according to an embodiment of the present disclosure.

FIG. 4 is a partially enlarged schematic view of an inner flat wire conductor in FIG. 3. FIG. 5 shows two inner flat wire conductors according to an embodiment of the present disclosure. FIG. 6 is a schematic diagram of an inner flat wire conductor according to an embodiment of the present disclosure. As illustrated in FIGS. 4-6, the inner flat wire conductor 22 includes a bridging segment 221, and a first coupling segment **222*a* and a second coupling segment 222*b* embedded in the stator core 1, and the bridging segment 221 is coupled between the first coupling segment 222*a* and the second coupling segment 222*b*. Specifically, as illustrated in FIGS. 4 and 6, the first coupling segment 222*a* and the second coupling segment 222*b* may be located at two ends of the inner flat wire conductor 22, and the first coupling segment 222*a* and the second coupling segment 222*b* may extend along the axial direction of the stator core 1. The bridging segment 221 may be integrally formed between the first coupling segment 222*a* and the second coupling segment 222*b***.

During assembly, a part of the first coupling segment **222*a* and a part of the second coupling segment 222*b* may be embedded in the stator core 1, and the bridging segment 221 may substantially extend along the circumferential direction of the stator core 1, so that the first coupling segment 222*a* and the second coupling segment 222*b* may be bridged in the circumferential direction of the stator core 1**.

In the axial direction of the stator core 1, a first extension dimension of the first coupling segment **222*a* extending to an outside of the stator core 1 and a second extension dimension of the second coupling segment 222*b* extending to the outside of the stator core 1** are different. For example, the first extension dimension may be larger than the second extension dimension, and in other embodiments, the first extension dimension may also be smaller than the second extension dimension.

Therefore, when all the inner flat wire conductors 22 are assembled on the stator core 1, the first coupling segment **222*a* and the second coupling segment 222*b* of an overlapped part 23 of two adjacent inner flat wire conductors 22 in the circumferential direction of the stator core 1 will form an axial length difference L. Specifically, as illustrated in FIG. 5, in the circumferential direction of the stator core 1, the two adjacent inner flat wire conductors 22 are arranged in a overlapped manner. For example, the second coupling segment 222*b* of a left inner flat wire conductor 22 may be located at a right side of the first coupling segment 222*a* of a right inner flat wire conductor 22, so that the bridging segments of the two inner flat wire conductors 22 are arranged crosswise and form the overlapped part 23**.

Due to the axial length difference L between the first coupling segment **222*a* and the second coupling segment 222*b* of the two inner flat wire conductors 22 at the overlapped part 23, the overlapped part 23 of the two inner flat wire conductors 22 will form a staggered approach avoidance in the axial direction, thus avoiding the situation that when the overlapped part 23 of the two inner flat wire conductors 22 are located at the same extension dimension in the axial direction and have the same extension size, it is easy to cause an overall dimension of the stator core 1** in the radial direction to be larger, thus reducing the intrusion into the central hole.

Secondly, the axial length difference may provide a deformation space in an up-and-down direction (axial direction) for bending deformation of the bridging segment 221, thus avoiding the situation that the bending deformation of the bridging segment 221 may only occur in the radial direction of the stator core 1, which easily causes the bridging segment 221 to intrude into the central hole 11 due to a large width dimension in the radial direction of the stator core 1. That is, the intrusion deformation of the bridging segment 221 into the central hole 11 may be converted into an axial deformation of the bridging segment 221 along the axial direction of the stator core 1, which further reduces the intrusion of the stator core 1 into the central hole 11. The motor of embodiments of the present disclosure improves the situation that the inner flat wire conductor 22 of the end winding 2 intrudes into the inner diameter space (i, e. central hole 11) of the stator core 1, avoids the situation that the rotor is easily interfered with the inner flat wire conductor 22 when it is assembled from the end of the stator core 1 into the central hole 11, facilitates the assembly of the rotor into the stator core, and improves the assemblability.

Figure 7:
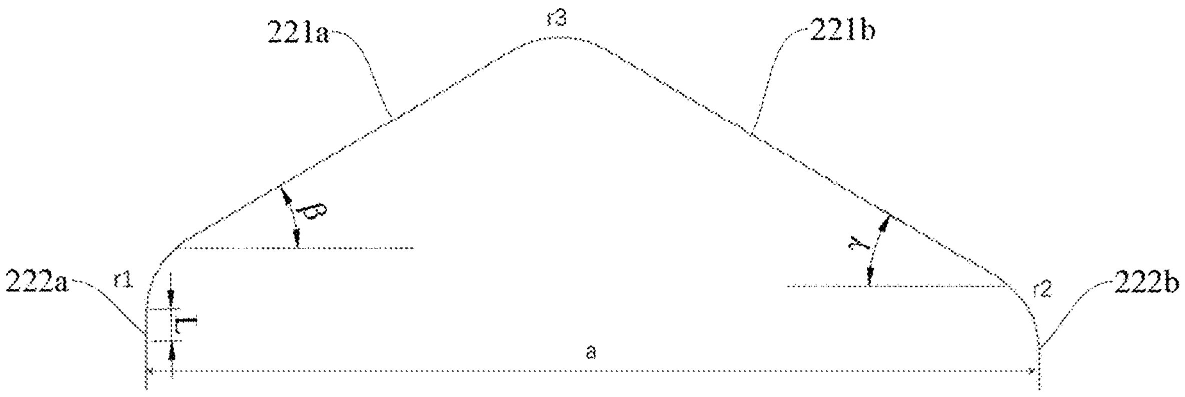
FIG. 7 is a schematic diagram of a characteristic line of the inner flat wire conductor in FIG. 6.

FIG. 7 is a schematic diagram of a characteristic line of the inner flat wire conductor in FIG. 6. In some embodiments, as illustrated in FIGS. 6 and 7, a ratio of the axial length difference L between a part of the first coupling segment **222*a* located outside the stator core 1 and a part of the second coupling segment 222*b* located outside the stator core 1 to a width dimension M of the inner flat wire conductor 22** is 0.25 to 4. For example, the ratio may be 0.25, 0.3, 0.35, 0.4, 0.5, 0.6, 0.8, 1.0, 1.2, 1.5, 1.6, 1.8, 2, 3, 4 and so on.

Within this range, the situation that the intrusion of the bridging segment 221 into the central hole 11 may be improved, and the axial length difference L may be limited within a reasonable range, thus ensuring the structural strength and stability of the three-dimensional inner flat wire conductor 22 and facilitating the molding of a three-dimensional shape of the inner flat wire conductor 22.

In some embodiments, the first coupling segment **222*a* is higher than the second coupling segment 222*b*, and two end faces of the stator core 1 may be provided with an insulating paper. The insulating paper has an extension dimension along the axial direction of the stator core 1, and the extension dimension of the second coupling segment 222*b* located outside the stator core 1 is identical to the extension dimension of the insulating paper at the end of the motor in the axial direction. Therefore, a better insulation protection effect may be achieved. In some embodiments, as illustrated in FIGS. 6 and 7, the extension part of the first coupling segment 222*a* located outside the stator is higher than the extension part of the second coupling segment 222*b* located outside the stator core 1, and the part of the second coupling segment 222*b* located outside the stator core 1 has an extension dimension H of 3 mm to 5 mm along the axial direction of the stator core 1. For example, the extension dimension H may be 3 mm, 3.5 mm, 4 mm, 4.5 mm, 5 mm, etc. Therefore, a distance between the bridging segment 221 and the end of the stator core 1** may be within a reasonable range, which is beneficial to guarantee of the stability of the structure.

In some embodiments, as illustrated in FIG. 6, the bridging segment 221 includes a first segment 221*a* and a second segment 221*b*, and the first segment 221*a* and the second segment 221*b* have opposite inclination directions. For example, the first segment 221*a* may be located at a left side of the second segment 221*b*, the first segment 221*a* is arranged obliquely in a direction from lower left to upper right, and the second segment 221*b* is arranged obliquely in a direction from upper left to lower right, so that the three-dimensional bending of the bridging segment 221 may be realized, and the shaping of the bridging segment 221 with sufficient length is relatively simple, which is beneficial to improving the utilization rate of the end space.

As illustrated in FIG. 7, the end face of the stator core 1 is a surface perpendicular to the axial direction of the stator core 1. An extending direction of the first segment 221*a* and the end face of the stator core 1 form an angle β, an extending direction of the second segment 221*b* and the end face of the stator core 1 form an angle γ, and the angle β and the angle γ are acute angles.

In some embodiments, as illustrated in FIG. 4, the stator core 1 is provided with a plurality of assembly slots 12, and the plurality of assembly slots 12 are arranged at equal intervals along the circumferential direction of the stator core 1. The assembly slots 12 may be rectangular slots, a slot-depth direction of each assembly slot 12 may be the radial direction of the stator core 1, and each assembly slot 12 may extend through the stator core 1 along the axial direction of the stator core 1.

The extending directions of the first coupling segment 222*a* and the second coupling segment 222*b* may be arranged perpendicular to the end face of the stator core 1, and a part of the first coupling segment 222*a* and a part of the second coupling segment 222*b* are respectively embedded in different assembly slots 12. Furthermore, the embedded part of the first coupling segment 222*a* and the embedded part of the second coupling segment 222*b* may be located at a same slot depth in different assembly slots 12, so that the inner flat wire conductors 22 in the same layer may be bridged.

Sizes of the angle β and the angle γ are positively correlated with the number of assembly slots 12. That is, the more the number of assembly slots 12 in the stator core 1, the larger the angle β and the angle γ are. Specifically, when the number of assembly slots 12 increases, a corresponding central angle between two adjacent assembly slots 12 will be smaller, and spacing between two adjacent assembly slots 12 will be shortened accordingly. At this time, the increase of angle β and angle γ is beneficial to the arrangement of the bridging segment 221, which avoids the situation that the bridging segment 221 is not easy to bend within a small range, improving the machining adaptability.

In some embodiments, as illustrated in FIG. 6, the first segment 221*a* is coupled to the first coupling segment 222*a*, and the size of the angle β is positively correlated with the extension dimension of the first coupling segment 222*a* located outside the stator core 1. For example, when the extension dimension of the extension part of the first coupling segment 222*a* located outside the stator core 1 is large, the angle β is also large.

Similarly, the second segment 221*b* is coupled to the second coupling segment 222*b*, and the size of the angle γ is positively correlated with the extension dimension of the second coupling segment 222*b* located outside the stator core 1. For example, when the extension dimension of the extension part of the second coupling segment 222*b* located outside the stator core 1 is large, the angle γ is also large.

In some embodiments, as illustrated in FIGS. 4 and 6, the first segment 221*a* and the second segment 221*b* are arranged in a staggered manner in the radial direction of the stator core 1, a distance between the first segment 221*a* and a hole wall of the center hole 11 is smaller than a distance between the second segment 221*b* and the hole wall of the center hole 11, and an inner peripheral wall of the first segment 221*a* and the hole wall of the center hole 11 are substantially located in the same curved surface. In other embodiments, the inner peripheral wall of the first segment 221*a* may also be located outside the hole wall of the central hole 11, thereby avoiding the situation that the bridging segment 221 close to the central hole 11 intrudes into the central hole 11.

It should be noted that since a joint of the first segment 221*a* and the second segment 221*b* forms a part of the overlapped part, and the part of the first segment 221*a* corresponding to the overlapped part 23 is easy to produce radial intrusion into the central hole 11, when assembling, the inner peripheral wall of the part of the first segment 221*a* corresponding to the overlapped part 23 may be constrained to a position which is flush with the hole wall of the central hole 11 or located outside of the hole wall of the central hole 11, to realize the overall constraint on the inner peripheral wall of the first segment 221*a*, thereby avoiding the radial intrusion of the first segment 221*a* into the central hole 11.

In some examples, the distance between the first segment 221*a* and the hole wall of the central hole 11 is not less than 0.4 mm.

In some embodiments, the sizes of the angle β and the angle γ are positively correlated with the width dimension M of the inner flat wire conductor 22. The larger the width dimension M, the less likely the inner flat wire conductor 22 is be bent and shaped. At this time, the angle β and the angle γ reduce the requirements for bending and shaping of the inner flat wire conductor 22 and reduce the machining difficulty.

In some embodiments, as illustrated in FIGS. 6 and 7, a bridging distance between the first coupling segment 222*a* and the second coupling segment 222*b* may be a, the first coupling segment 222*a* and the first segment 221*a* may be coupled by a rounded transition and have a bending radius r1, the second coupling segment 222*b* and the second segment 221*b* may be coupled by a rounded transition and have a bending radius r2, and the first segment 221*a* and second segment 221*b* may be coupled by a rounded transition and have a bending radius r3, to avoid stress concentration and be beneficial to the stability of the overall structure.

In some embodiments, as illustrated in FIG. 8, each conductor group 24 includes a plurality of flat wire conductors 241 arranged at intervals along the radial direction of the stator core 1. For example, along a direction from inside to outside, corresponding central angles between two adjacent flat wire conductors 241 may be a1, a2, a3, a4, etc. Therefore, a space may be formed between the flat wire conductors 241 for oil and the like to flow in, and the heat dissipation and cooling performance of the end winding 2 may be improved.

In some embodiments, the angles formed between any two adjacent flat wire conductors 241 are all equal, thus ensuring the consistency of heat dissipation effect of each flat wire conductor 241.

A vehicle according to embodiments of the present disclosure will be described below.

The vehicle according to embodiments of the present disclosure includes a motor, and the motor may be the motor as described in any of the above embodiments. The vehicle is a new energy vehicle, specifically a car, a SUV, a truck or other vehicles.

The motor of embodiments of the present disclosure includes: a stator. The stator includes a stator core and an end winding. The stator core has a central hole configured for assembly of a rotor. The end winding is arranged at an end of the stator core, and the end winding includes an inner flat wire conductor adjacent to the central hole. The inner flat wire conductor includes a bridging segment, and a first coupling segment and a second coupling segment embedded in the stator core, and the bridging segment is coupled between the first coupling segment and the second coupling segment. An extension dimension of the first coupling segment of the inner flat wire conductor and an extension dimension of the second coupling segment of an adjacent inner flat wire conductor have an axial length difference in an axial direction of the stator core, so that an overlapped part of two adjacent inner flat wire conductors form staggered approach avoidance in the axial direction and reduce radial intrusion into the central hole.

In some embodiments, a ratio of the axial length difference L between a part of the first coupling segment located outside the stator core and a part of the second coupling segment located outside the stator core to a width dimension M of the inner flat wire conductor is 0.25 to 4.

In some embodiments, the first coupling segment is higher than the second coupling segment, and the axial length difference L is 3 mm to 5 mm.

In some embodiments, the bridging segment includes a first segment and a second segment, and the first segment and the second segment having opposite inclination directions; an extending direction of the first segment and an end face of the stator core form an angle β, and an extending direction of the second segment and the end face of the stator core form an angle γ, and the angle β and the angle γ are acute angles.

In some embodiments, the stator core is provided with a plurality of assembly slots arranged at intervals along a circumferential direction of the stator core, the first coupling segment and the second coupling segment are respectively embedded in different assembly slots, and sizes of the angle β and the angle γ are positively correlated with a number of the assembly slots.

In some embodiments, the first segment is coupled to the first coupling segment, and a size of the angle β is positively correlated with an extension dimension of the first coupling segment located outside the stator core; and/or, the second segment is coupled to the second coupling segment, and a size of the angle γ is positively correlated with an extension dimension of the second coupling segment located outside the stator core.

In some embodiments, the first segment and the second segment are arranged in a staggered manner in a radial direction of the stator core, a distance between the first segment and a hole wall of the central hole is smaller than a distance between the second segment and the hole wall of the central hole, and an inner peripheral wall of the first segment is flush with or located outside the hole wall of the central hole.

In some embodiments, the angle β and the angle γ are positively correlated with a width dimension M of the inner flat wire conductor.

In some embodiments, the end winding includes a plurality of conductor groups arranged at intervals along a circumferential direction of the stator core, and each conductor group includes a plurality of flat wire conductors arranged at intervals along a radial direction of the stator core, and a flat wire conductor located at an innermost side of a same conductor group is the inner flat wire conductor.

The vehicle of embodiments of the present disclosure includes a motor as described in any of the above embodiments.

In the description of the present disclosure, it should be understood that, the azimuth or positional relationship indicated by terms "center", "length", "width", "up", "down", "left", "right", "vertical", "horizontal", "inside", "outside", "axial", "radial" and "circumferential" is based on the azimuth or positional relationship illustrated in the attached drawings, which is only for the convenience of describing the present disclosure and simplifying the description, and does not indicate or imply that the device or element must have a specific orientation, be constructed and operated in a specific orientation, so it cannot be understood as a limitation of the present disclosure.

In addition, the terms "first" and "second" are only used for descriptive purposes, and cannot be understood as indicating or implying relative importance or implicitly indicating the number of indicated technical features. Therefore, the features defined as "first" and "second" may explicitly or implicitly include at least one of these features. In the description of the present disclosure, "plural" means at least two, such as two, three, etc., unless otherwise specifically defined.

In the present disclosure, unless otherwise specified and limited, the terms "install", "couple", "connect" and "fix" should be broadly understood, for example, which may be fixed connected, detachable connected or integrated; which may be mechanically connected, electrically connected or communicated with each other; which may be directly connected or indirectly connected through an intermediary, and may be the internal connection of two elements or the interaction between two elements, unless otherwise specified. For those skilled in the art, the specific meanings of the above terms in the present disclosure may be understood according to specific situations.

In the present disclosure, unless otherwise specified and limited, the first feature "above" or "below" the second feature may be that the first and second features are in direct contact, or the first and second features are in indirect contact through an intermediary. Moreover, the first feature is "upon", "above" and "on" the second feature, which may mean that the first feature is directly above or obliquely above the second feature, or just means that the horizontal height of the first feature is higher than the second feature. The first feature is "down", "below" and "under" the second feature, which may mean that the first feature is directly or obliquely below the second feature, or just means that the horizontal height of the first feature is smaller than the second feature.

In the description of this specification, descriptions referring to the terms "an embodiment", "some embodiments", "an example", "a specific example", or "some examples" mean that specific features, structures, materials or characteristics described in connection with this embodiment or example are included in at least one embodiment or example of this disclosure. In this specification, the schematic expressions of the above terms do not necessarily refer to the same embodiment or example. Moreover, the specific features, structures, materials or characteristics described may be combined in any one or more embodiments or examples in a suitable manner. In addition, those skilled in the art may combine and combine different embodiments or examples and features of different embodiments or examples described in this specification without contradicting each other.

Although the above-mentioned embodiments have been illustrated and described, it may be understood that the above-mentioned embodiments are exemplary and cannot be understood as limitations of the present disclosure, and changes, modifications, substitutions and variations made to the above-mentioned embodiments by those skilled in the art are within the protection scope of the present disclosure.

What is claimed is:

1. A motor, comprising:

a stator comprising:

a stator core having a central hole configured for assembly of a rotor; and an end winding arranged at an end of the stator core, and comprising an inner flat wire conductor adjacent to the central hole, wherein the inner flat wire conductor comprises a bridging segment, and a first coupling segment and a second coupling segment embedded in the stator core, and the bridging segment is coupled between the first coupling segment and the second coupling segment;

an extension dimension of the first coupling segment of the inner flat wire conductor and an extension dimension of the second coupling segment of an adjacent inner flat wire conductor have an axial length difference in an axial direction of the stator core, so that an overlapped part of two adjacent inner flat wire conductors form staggered approach avoidance in the axial direction and reduce radial intrusion into the central hole, wherein the bridging segment comprises a first segment and a second segment, and the first segment and the second segment have opposite inclination directions; and wherein an extending direction of the first segment and an end face of the stator core form an angle β, an extending direction of the second segment and the end face of the stator core form an angle γ, and the angle β and the angle γ are acute angles.

2. The motor according to claim 1, wherein a ratio of an axial length difference L between a part of the first coupling segment located outside the stator core and a part of the second coupling segment located outside the stator core to a width dimension M of the inner flat wire conductor is 0.25 to 4.

3. The motor according to claim 1, wherein the first coupling segment is higher than the second coupling segment, and the axial length difference L is 3 mm to 5 mm.

4. The motor according to claim 3, wherein an end face of the stator core is provided with an insulating paper, the insulating paper has an extension dimension along the axial direction of the stator core, and an extension dimension of the second coupling segment located outside the stator core is identical to the extension dimension of the insulating paper along the axial direction of the stator core.

5. The motor according to claim 1, wherein the end face of the stator core is a surface perpendicular to the axial direction of the stator core.

6. The motor according to claim 1, wherein the stator core is provided with a plurality of assembly slots arranged at intervals along a circumferential direction of the stator core, the first coupling segment and the second coupling segment are respectively embedded in different assembly slots, and sizes of the angle β and the angle γ are positively correlated with a number of the assembly slots.

7. The motor according to claim 6, wherein each assembly slot is a rectangular slot, a slot-depth direction of each assembly slot is a radial direction of the stator core, and each assembly slot extends through the stator core along the axial direction of the stator core.

8. The motor according to claim 7, wherein extending directions of the first coupling segment and the second coupling segment are arranged perpendicular to the end face of the stator core, a part of the first coupling segment and a part of the second coupling segment are respectively embedded in different assembly slots; and the embedded part of the first coupling segment and the embedded part of the second coupling segment are located at a same slot depth in different assembly slots.

9. The motor according to claim 1, wherein the first segment is coupled to the first coupling segment, and a size of the angle β is positively correlated with an extension dimension of the first coupling segment located outside the stator core.

10. The motor according to claim 1, wherein the second segment is coupled to the second coupling segment, and a size of the angle γ is positively correlated with an extension dimension of the second coupling segment located outside the stator core.

11. The motor according to claim 1, wherein the first segment is coupled to the first coupling segment, and a size of the angle β is positively correlated with an extension dimension of the first coupling segment located outside the stator core; and the second segment is coupled to the second coupling segment, and a size of the angle γ is positively correlated with an extension dimension of the second coupling segment located outside the stator core.

12. The motor according to claim 1, wherein the first segment and the second segment are arranged in a staggered manner in a radial direction of the stator core, a distance between the first segment and a hole wall of the central hole is smaller than a distance between the second segment and the hole wall of the central hole, and an inner peripheral wall of the first segment is flush with or located outside the hole wall of the central hole.

13. The motor according to claim 12, wherein a distance between the first segment and the hole wall of the central hole is not less than 0.4 mm.

14. The motor according to claim 1, wherein the angle β and the angle γ are positively correlated with a width dimension M of the inner flat wire conductor.

15. The motor according to claim 1, wherein the end winding comprises a plurality of conductor groups arranged at intervals along a circumferential direction of the stator core, and each conductor group comprises a plurality of flat wire conductors arranged at intervals along a radial direction of the stator core, and a flat wire conductor located at an innermost side of each conductor group is the inner flat wire conductor.

16. The motor according to claim 1, wherein the stator has two end windings, and the two end windings are respectively arranged at two ends of the stator core in an axial direction.

17. The motor according to claim 1, wherein the first coupling segment and the second coupling segment are respectively located at two ends of the inner flat wire conductor, the first coupling segment and the second coupling segment extend along the axial direction of the stator core, and the bridging segment is integrally formed between the first coupling segment and the second coupling segment.

18. The motor according to claim 1, wherein the bridging segment extends along a circumferential direction of the stator core.

19. A vehicle, comprising:

a motor, comprising:

a stator comprising:

a stator core having a central hole configured for assembly of a rotor; and an end winding arranged at an end of the stator core, and comprising an inner flat wire conductor adjacent to the central hole, wherein the inner flat wire conductor comprises a bridging segment, and a first coupling segment and a second coupling segment embedded in the stator core, and the bridging segment is coupled between the first coupling segment and the second coupling segment;

an extension dimension of the first coupling segment of the inner flat wire conductor and an extension dimension of the second coupling segment of an adjacent inner flat wire conductor have an axial length difference in an axial direction of the stator core, so that an overlapped part of two adjacent inner flat wire conductors form staggered approach avoidance in the axial direction and reduce radial intrusion into the central hole, wherein the bridging segment comprises a first segment and a second segment, and the first segment and the second segment have opposite inclination directions; and wherein an extending direction of the first segment and an end face of the stator core form an angle β, an extending direction of the second segment and the end face of the stator core form an angle γ, and the angle β and the angle γ are acute angles.

* * * * *